UNITED STATES PATENT OFFICE.

WILLIAM OHARA, OF CHICAGO, ILLINOIS.

PROCESS OF REFINING AND HARDENING LARD.

SPECIFICATION forming part of Letters Patent No. 251,629, dated December 27, 1881.

Application filed September 22, 1881. (No specimens.)

*To all whom it may concern:*

Be it known that I, WILLIAM OHARA, of Chicago, in the county of Cook and State of Illinois, have invented or discovered certain new and useful Improvements in a Process of Hardening and Refining Lard; and I do hereby declare that the following is a full, clear, and exact description of the invention, which will enable others skilled in the art to which it appertains to make use of the same.

This invention relates to a process of hardening and refining lard, so that it will better resist the changes of temperature; and it consists in adding to the lard a certain proportion of stearine and saltpeter, as will be hereinafter more fully set forth.

In carrying out my invention I first take the lard, place it in a proper agitating-vessel, and subject it to just sufficient steam-heat to reduce it to a liquid. I then add the proportion of ten pounds of stearine, in a melted state, to each one hundred pounds of lard, thoroughly mixing the two together until the stearine becomes a component part. I next add to each one hundred pounds of lard the proportion of two and one-half ounces of saltpeter which has first been dissolved in a small quantity of water. The compound is now agitated again and allowed to cool, when the lard is ready for the market.

The lard prepared in this manner has a firmer texture and will not liquefy from the effect of natural heat, and thereby become rancid and sour from irregular changes of temperature, which is the case when the lard has merely passed through the ordinary rendering process. This process also imparts a much whiter appearance to the lard.

Having thus described my invention, what I claim, and desire to secure by Letters Patent, is—

The process of hardening and refining lard by adding the proportion of ten pounds of stearine to each one hundred pounds of lard when both are in a melted state, then thoroughly agitating and mixing the same, and finally adding two and one-half ounces of saltpeter to the above proportions, all substantially as described.

WILLIAM OHARA.

Witnesses:
 PATRICK ROONEY,
 L. B. COUPLAND.